US011802940B2

(12) United States Patent
Keegan et al.

(10) Patent No.: US 11,802,940 B2
(45) Date of Patent: Oct. 31, 2023

(54) METHOD AND SYSTEM FOR ELECTRONIC WARFARE OBSCURATION AND SUPPRESSION OF ENEMY DEFENSES

(71) Applicant: Leonardo Electronics US Inc., Arlington, VA (US)

(72) Inventors: Matthew Keegan, McLean, VA (US); John R. M. Innes, Edinburgh (GB); Steven T. Rehermann, Ashburn, VA (US)

(73) Assignee: LEONARDO ELECTRONICS US INC, Arlington, VA (US)

( * ) Notice: Subject to any disclaimer, the term of this patent is extended or adjusted under 35 U.S.C. 154(b) by 708 days.

(21) Appl. No.: 16/927,780

(22) Filed: Jul. 13, 2020

(65) Prior Publication Data

US 2021/0109192 A1 Apr. 15, 2021

Related U.S. Application Data

(60) Provisional application No. 62/873,698, filed on Jul. 12, 2019.

(51) Int. Cl.
*F42B 10/56* (2006.01)
*G01S 7/38* (2006.01)
(Continued)

(52) U.S. Cl.
CPC ............ *G01S 7/38* (2013.01); *F41H 13/0093* (2013.01); *F42B 10/56* (2013.01); *F42B 12/02* (2013.01); *F42B 12/365* (2013.01); *H04K 3/80* (2013.01)

(58) Field of Classification Search
CPC .......... F41H 13/00; F42B 10/56; F42B 12/02; F42B 12/365; G01S 7/38
See application file for complete search history.

(56) References Cited

U.S. PATENT DOCUMENTS

| 5,388,783 A * | 2/1995 | Lynn ....................... F41G 7/224 244/3.14 |
| 6,933,877 B1 | 8/2005 | Halladay |

(Continued)

FOREIGN PATENT DOCUMENTS

| EP | 0466499 | 1/1992 |
| JP | 7-151500 | 6/1995 |

(Continued)

OTHER PUBLICATIONS

International Preliminary Report on Patentability issued in related PCT International Patent Application Serial No. PCT/US20/41835, dated Jan. 18, 2022 (7 pgs).

(Continued)

*Primary Examiner* — J. Woodrow Eldred
(74) *Attorney, Agent, or Firm* — HAYES SOLOWAY P.C.

(57) ABSTRACT

An apparatus, system, and method for deployment of an electronic warfare (EW) asset are provided. The system includes a projectile launching device capable of launching a projectile round. An EW asset is detachably carried by the projectile round. A deployable parachute is attached to the EW asset, wherein the EW asset is configured to be suspended from the parachute when the EW asset is detached from the projectile round. The related method is used for suppression or obscuration of enemy counterfire radar (CFR) system by initiating an EW effect by the EW asset as the EW asset floats towards a ground surface.

15 Claims, 6 Drawing Sheets

(51) Int. Cl.
    *F42B 12/36*     (2006.01)
    *H04K 3/00*     (2006.01)
    *F41H 13/00*     (2006.01)
    *F42B 12/02*     (2006.01)

(56) References Cited

U.S. PATENT DOCUMENTS

| | | | |
|---|---|---|---|
| 9,074,843 | B1 | 7/2015 | Montgomery |
| 2007/0046524 | A1* | 3/2007 | Weisbrod ............... H01Q 15/20 |
| | | | 342/9 |
| 2008/0276821 | A1 | 11/2008 | Stancil |
| 2009/0007766 | A1 | 1/2009 | Turner |
| 2015/0128823 | A1* | 5/2015 | Akcasu ............... F42B 10/56 |
| | | | 102/501 |
| 2015/0244451 | A1* | 8/2015 | Baeckman ............... F42B 15/08 |
| | | | 455/427 |

FOREIGN PATENT DOCUMENTS

| | | |
|---|---|---|
| WO | WO2006001856 | 1/2006 |
| WO | WO2019132758 | 7/2019 |

OTHER PUBLICATIONS

European Search Report issued in related European Patent Application Serial No. 20854281.1, dated May 11, 2022, 7 pages.

"Silent Impact™ Munition Launched EW System" *Electronic Warfare*, www.srcinc.com, 2020, 2 pages.

International Search Report and Written Opinion issued in related PCT International Patent Application Serial No. PCT/US20/41835, dated Feb. 9, 2021 (9 pgs).

Israeli Official Action issued in related Israeli Patent Application Serial No. 282831, dated Aug. 9, 2023, 10 pages.

\* cited by examiner

METHOD AND SYSTEM FOR ELECTRONIC WARFARE OBSCURATION AND SUPPRESSION OF ENEMY DEFENSES

CROSS REFERENCE TO RELATED APPLICATION

This application claims benefit of U.S. Provisional Application Ser. No. 62/873,698 entitled, "Method and System for Electronic Warfare Obscuration and Suppression of Enemy Defenses" filed Jul. 12, 2019, the entire disclosure of which is incorporated herein by reference.

FIELD OF THE DISCLOSURE

The present disclosure is related generally to methods and systems for obscuration of electronic sensors with the effect of suppressing enemy electronic sensors integral to air defense, artillery counterfire, and intelligence collection and more particularly to obscuration and suppression of enemy ground, naval and air defenses and for protection of friendly ground, water and air strike troops, supplies and equipment.

BACKGROUND OF THE DISCLOSURE

In modern day warfare, freedom of maneuver is critical to accomplish battlefield objectives. The suppression of an enemy's air defenses, field artillery, and sensor-based intelligence collection is of paramount importance if battlefield supremacy is to be achieved. Also of significant importance is obscuration of an enemy's observation of ground, water and air strike troops, supplies and equipment.

Counterfire radars and other electronic sensors enable an enemy to precisely locate friendly indirect fire assets, e.g. missiles, artillery, and mortars, by providing hostile forces with precise location to enable rapid and effective counterfire by their own indirect fire systems. In addition to locating and directing kinetic fires on hostile indirect fire assets, friendly forces use various means of self-protection including dispersal of assets and frequently re-positioning. These means of self-protection increase the complexity of command, control, and logistics while concurrently reducing their ability to perform their mission while re-positioning.

Cannon-launched and ground-based missile ammunition with electronic warfare (EW) payloads may be used to deliver obscuring effects on enemy counterfire radars, thus reducing the enemy's ability to locate friendly indirect fire assets. They are particularly useful in situations where friendly forces have not precisely located enemy counterfire sensors and therefore unlikely to achieve effects with kinetic, lethal ammunition. In this situation, EW payloads may be delivered against templated or suspected counterfire sensor locations concurrent to delivery of kinetic, lethal fires on accurately located counterfire sensors. Through sustained fires, effects may be achieved for a period of time sufficient for the friendly force to perform its mission with reduced risk of enemy counterfires.

Surface-to-air missile (SAM) systems are increasingly employed in warfare to counteract the use of an adversary's aircraft. SAM systems generally utilize one or more missiles designed to be launched from the ground or naval ships to destroy aircraft or other objects, such as other missiles. The proliferation of advanced SAM systems creates an increased difficulty for military forces to establish and maintain air dominance over disputed territory or in air corridors that must be established for brief periods of time.

Current methods of countering SAM systems may involve the use of expensive, complex, manned air assets, generally referred to as anti-SAM assets. Manned, Suppression of Enemy Air Defenses (SEAD) assets often carry EW devices which are designed to permanently or temporarily disable the SAM systems by using directed energy to control the electromagnetic spectrum to destroy, interfere, or otherwise disrupt the electronic controls used by SAM systems. The directed energy may include, for example, radio frequencies, radar frequencies, and/or infrared (IR), visible, ultraviolet, and other less used portions of the electromagnetic (EM) spectrum. Examples of the type of EW that can be achieved include self-protection, standoff, and escort jamming, and antiradiation attacks utilizing devices such as Digital Radio Frequency Memory (DRFM) systems or other spoofing and/or jamming systems.

In order to properly counter SAM systems, SEAD assets typically must be able to achieve a position that is relatively close to the SAM systems. As a practical matter, and depending on the type of EW measure being directed to the SAM systems, the SEAD assets must be present in the field of range of the SAM systems to sustain the EW effect for the duration of the mission. Many commonly deployed SEAD assets are manned aircraft (e.g. F-16s, EF-18Gs, et al.), which are large enough to be detected by the SAM systems, and therefore, are themselves threatened by the SAM systems they are designed to defeat.

In order to address the problem of SEAD assets guise, there is an increasing use of cannon-launched projectiles and ground-based missile systems having an electronic payload. Projectiles or missiles may be fired to function near a SAM system and initiate an electronic warfare effect on the air defense site using the electronic warfare payload carried by the projectile or missile, i.e., to interfere with the surface-to-air missile (SAM) system. Once fired, projectiles and missiles are relatively and less likely to be detected by SAM systems, and if detected, they cannot be easily defeated. EW effects delivered by cannon-launched projectiles and ground-based missile fires can be sustained for a sufficient period of time to support an attack on the integrated air defense (IAD) site.

Thus, a heretofore unaddressed need exists in the industry to address the aforementioned deficiencies and inadequacies.

SUMMARY OF THE DISCLOSURE

Embodiments of the present disclosure provide a system and method for deployment of an electronic warfare (EW) asset. Briefly described, in architecture, one embodiment of the system, among others, can be implemented as follows. A projectile launching device is capable of launching a projectile round. An EW asset is detachably carried by the projectile round. A deployable parachute is attached to the EW asset, wherein the EW asset is configured to be suspended from the parachute when the EW asset is detached from the projectile round.

In one aspect, the EW asset is configured to activate upon detachment from the projectile round.

In another aspect, the EW asset includes a radar jamming device.

In yet another aspect, the projectile round comprises at least one of: a guided projectile round; an unguided projectile round; an unguided rocket; or a guided missile.

In another aspect, the projectile round comprises at least one of: a powered projectile round; an unpowered projectile round; an unguided rocket; or a guided missile.

In another aspect, the EW asset provides obscuration from an enemy counterfire radar (CFR) system.

In this aspect, the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

The present disclosure can also be viewed as providing methods for deploying an Electronic Warfare (EW) asset for suppression or obscuration of an enemy counterfire radar (CFR) system. In this regard, one embodiment of such a method, among others, can be broadly summarized by the following steps: providing a projectile round carrying a detachable EW asset and parachute; launching the projectile round; separating the EW asset and parachute from the projectile round; and initiating an EW effect by the EW asset as the EW asset floats towards a ground surface.

In one aspect of the method, the projectile round is launched substantially over a CFR asset or over a battlefield.

In another aspect, initiating the EW effect provides obscuration from the enemy CFR system, wherein the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

In yet another aspect, the method includes launching lethal fire munitions at the CFR system concurrently, or substantially concurrently, with the launching of the projectile round carrying the EW asset.

In another aspect, the projectile round is fired from one of: a ground based field artillery piece; a naval vessel; or an airborne aircraft.

In another aspect, the projectile round comprises at least one of: a guided projectile round; an unguided projectile round; an unguided rocket; or a guided missile.

In another aspect, the projectile round comprises at least one of: a powered projectile round; an unpowered projectile round; an unguided rocket; or a guided missile.

The present disclosure can also be viewed as providing a deployable electronic warfare (EW) device. Briefly described, in architecture, one embodiment of the device, among others, can be implemented as follows. The deployable EW device has a projectile round. An EW asset is detachably carried by the projectile round. A deployable parachute is attached to the EW asset, wherein the EW asset is configured to be suspended from the parachute when the EW asset is detached from the projectile round. A system is provided for activating the EW asset after detachment from the projectile round.

In one aspect, the EW asset provides suppression or obscuration of an enemy counterfire radar (CFR) system.

In another aspect, the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

In yet another aspect, the projectile round is fired from one of: a ground based field artillery piece; a naval vessel; or an airborne aircraft.

In another aspect, the projectile round comprises at least one of: a guided projectile round; an unguided projectile round; an unguided rocket; or a guided missile.

In another aspect, the projectile round comprises at least one of: a powered projectile round; an unpowered projectile round; an unguided rocket; or a guided missile.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PRESENT INVENTION

Figure 1:
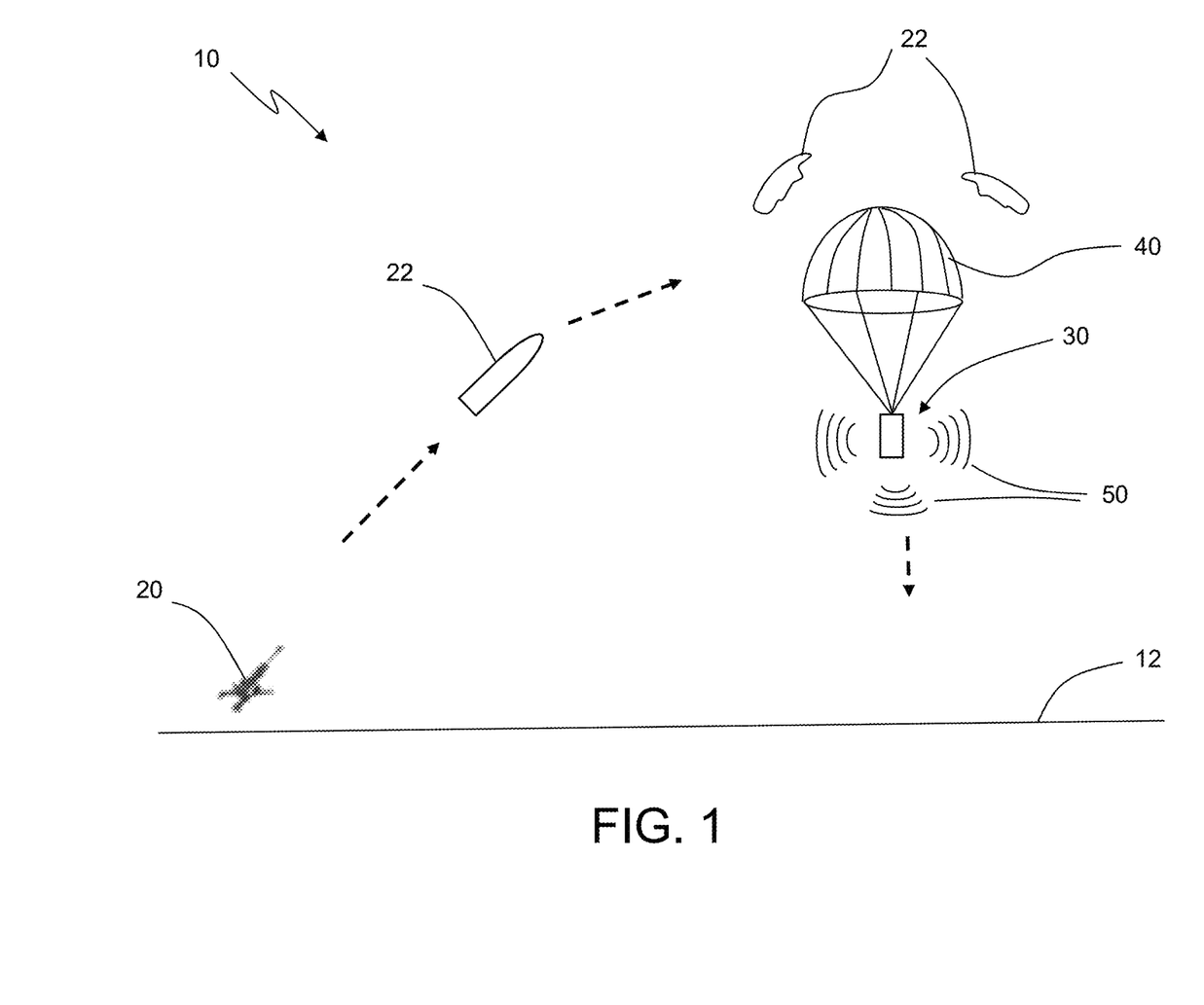
FIG. 1 schematically illustrates a system for deployment of an EW asset from a delivery round, in accordance with a first embodiment of the present disclosure.

FIG. 1 schematically illustrates a system for deployment of an EW asset from a delivery round 10, in accordance with a first embodiment of the present disclosure. The system for deployment of an EW asset from a delivery round 10, which may be referred to herein as 'system 10' includes a projectile launching device 20 capable of launching a projectile round 22. The projectile round 22 may be launched, fired, or otherwise projected to an elevated position above the ground surface 12, as indicated by the broken arrows in FIG. 1. An EW asset 30 is carried by the projectile round 22 and is capable of detaching from the projectile round 22. Detachment of the EW asset 30 from the projectile round 22 may occur before or after separation or destruction of the projectile round 22. Once the EW asset 30 is detached, a parachute 40 attached to the EW asset 30 may be deployed to allow the EW asset 30 to be suspended from the parachute 40, such that it has a slow, controlled gravitational fall from the elevated position. At a point in time after detachment of the EW asset 30 from the projectile round 22, one or more EW effects 50 may be sent, emitted, or otherwise transmitted from the EW asset 30.

Unlike conventional SEAD (Suppression of Enemy Air Defenses) systems which typically require manned vehicles to move the EW assets close enough to enemy assets, the system 10 may be used to deliver small, unmanned EW assets to aerial positions within a battlefield setting or other operational setting in order to suppress or counter enemy air defense, enemy artillery counterfire, and enemy intelligence collection sensors. The system 10 may also be used to successfully provide obscuration of friendly assets, such as friendly aircraft or ground troops, from enemy intelligence collection systems and sensors. Collectively, these are referred to as counterfire radar (CFR) assets. Specific scenarios of the suppression or obscuration of CFR assets are described in detail relative to FIGS. 2 and 4-6, where it is shown how the EW effects 50 may disrupt a CFR asset positioned proximate to the EW asset 30. The CFR asset may include any type of counterfire system, including, but not limited to surface-to-air missile (SAM) systems, a ground-based CFR asset, such as artillery or shelling weapons, an air-based CFR asset, such as an enemy aircraft, a long-range threat, such as an enemy aircraft which is outside of a firing range of friendly forces, an airborne warning and control system (AWACS) aircraft, or an intelligence, surveillance, and reconnaissance (ISR) aircraft, among others. The system 10 may be used in place of or in addition to conventional SEAD systems.

The EW asset 30 asset that is carried by the projectile round 22 may be fired from a ground based field artillery systems 20, as shown in FIG. 1, or it may be fired from another location, such as a naval vessel or an airborne aircraft. Similar to an illumination round or flare munitions device, the projectile round 22 may be launched to the desired aerial position and over or proximate to the desired CFR asset. However, unlike flare munitions devices which provide illumination, the EW asset 30 carried by the projectile round 22 does not provide illumination, but instead provides the ability to initiate the EW effects 50 and other EW measures.

It is noted that the projectile round 22 may include various types of projectile devices, including a guided projectile round, or an unguided projectile round, and may be a powered projectile round, an unpowered projectile round; an unguided rocket; or a guided missile. For example, the projectile round 22 may be a ballistic round launched from a conventional launching device 20. Or, in another example, the projectile round 22 may be a computer controlled projectile launched from a naval vessel or aircraft in a remote location, such that the projectile round 22 can travel to the desired EW effect deployment location. Other vehicles or vessels which are typically used to launch projectiles may also be used to launch the projectile round 22.

Separation of the EW asset 30 from the projectile round 22 may include an electromechanical separation prior to explosion of the projectile round 22, or the EW asset 30 may be separated from the projectile round 22 when it is exploded. In either case, the EW asset 30 may be separated without causing damage or harm to it. After separation from the projectile round 22, or in some cases, prior to separation, the EW asset 30 may be activated to initiate the EW effect 50. For example, activation of the EW effect 50 may occur at a predetermined time or at a time manually selected. For example, the EW asset 30 may be configured to activate upon detachment from the projectile round 22, at which point it initiates the EW effect 50. In other examples, the EW asset 30 may activate by manual control, e.g., through a human or computer-operated remote communication system. In other examples, the EW asset 30 may activate based on other criteria, such as a sensed elevation, a sensed geographic position, or a sensed enemy presence.

The EW effect 50 may include various types of electronic effects which can disrupt, jam, or otherwise temporarily or permanently incapacitate electrical or electromechanical equipment. For example, the EW asset 30 can deliver an EW effect 50 to jam enemy electronic sensors while floating down to the ground surface 12, while it is suspended by a parachute. The EW effect 50 may operate by using directed energy to control the electromagnetic spectrum to destroy, interfere, or otherwise disrupt the electronic controls used by enemy weapon, surveillance, or communication systems. The directed energy may include, for example, radio frequencies, radar frequencies, and/or infrared (IR), visible, ultraviolet, and other less used portions of the electromagnetic (EM) spectrum. Examples of the type of EW effect 50 that can be achieved include self-protection, standoff, and escort jamming, and antiradiation attacks utilizing devices such as Digital Radio Frequency Memory (DRFM) systems or other spoofing and/or jamming systems. In a preferred implementation, the EW effect 50 includes radar jamming measures. Other types of EW devices not explicitly described herein may also be used.

Figure 2:
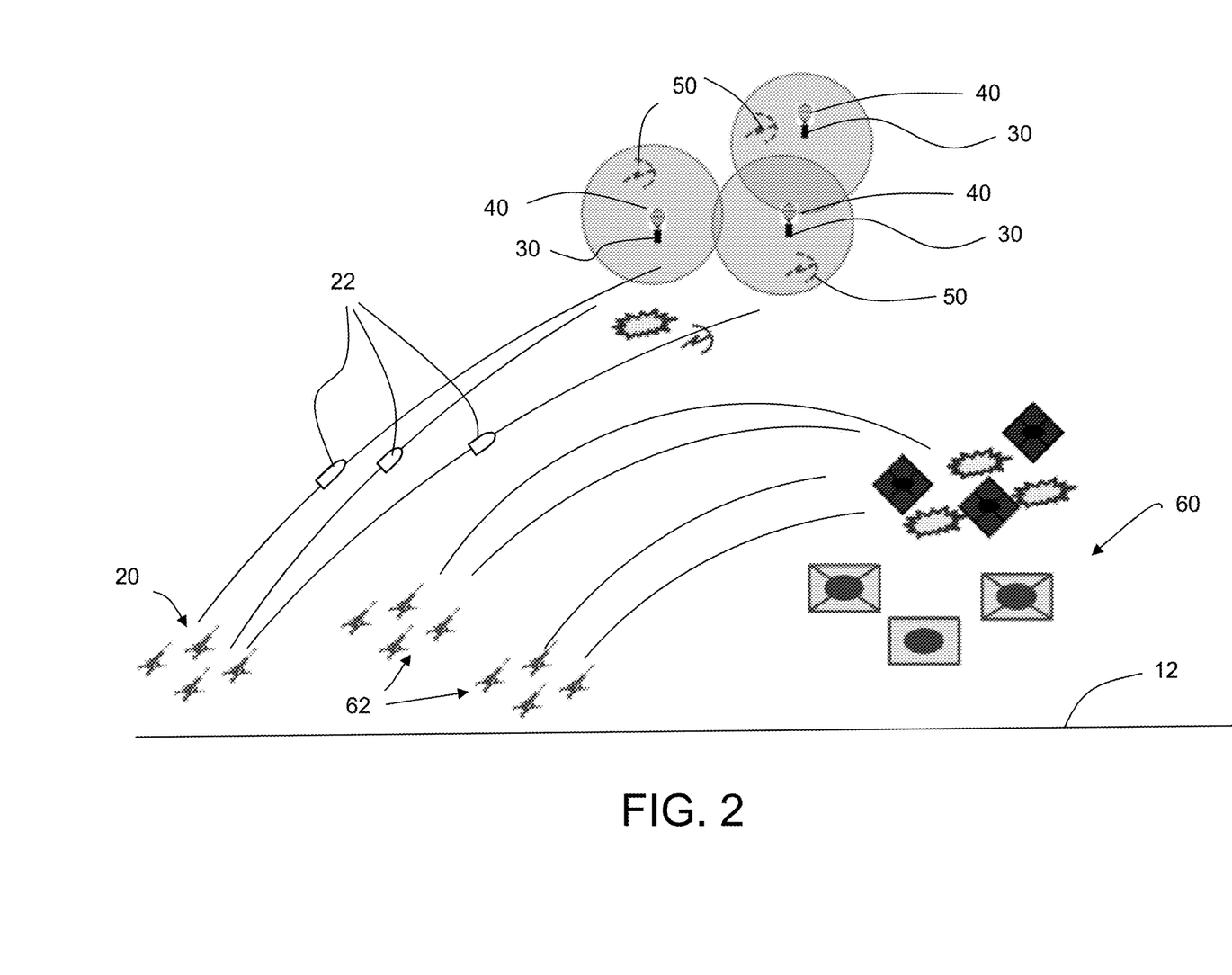
FIG. 2 schematically illustrates a deployment of an EW asset from a delivery round in a first scenario, in accordance with the first embodiment of the present disclosure.

FIG. 2 schematically illustrates a deployment of an EW asset from a delivery round in a first scenario, in accordance with the first embodiment of the present disclosure. In particular, FIG. 2 illustrates a scenario in which friendly maneuver forces are engaged in close combat with enemy or threat forces, supported by direct support field artillery (FA) counterfires. As shown, known locations of threat counterfire radars 60 (of the enemy), are engaged with conventional lethal weapons 62, which may deliver sustained fire on the threat maneuver forces. Concurrently, or substantially concurrently, friendly projectile launching devices 20 are employed to deliver projectile rounds 22 carrying EW assets 30. The counter fire (CF) radar may be located by doctrinal template or otherwise Large TLE methods suppressed by EW ammunition fires. The EW assets 30 may be detached from the projectile rounds 22. After detachment, the EW assets 30 permitted to float down to the ground surface 12 on parachutes 40 employing EW effects 50 to suppress or disrupt the capability of enemy threat counterfire radar (CFR) assets 60. CF radar located within Small TLEs may be used to engage with lethal FA fires. The floating EW assets 30 are typically able effectively to suppress the enemy threat CFR over a wider area than conventional, lethal FA fires.

Figure 3:
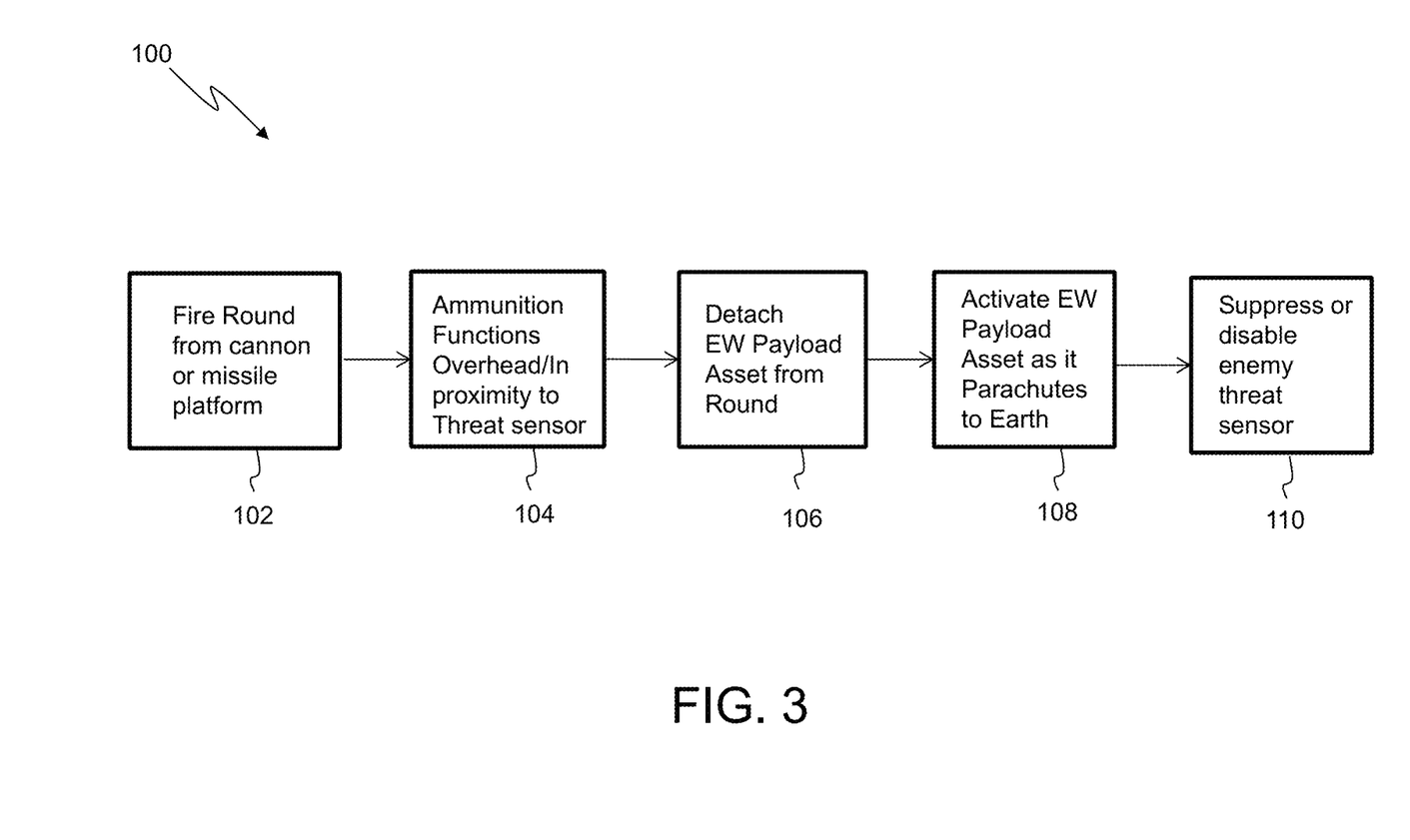
FIG. 3 is a block diagram illustrating firing, delivery and detachment of an EW asset from a delivery round, in accordance with the first embodiment of the present disclosure.

FIG. 3 is a block diagram 100 illustrating firing, delivery and detachment of an EW asset from a delivery round, in accordance with the first embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a round which may be, for example, a 155 mm round, carrying an EW asset, is fired from a ground based field artillery piece. The projectile round may be a guided round or an unguided round, such that the EW asset is moved overheard or in proximity to the threat sensor which is to be suppressed (block 104). The EW asset is then ejected from the projectile round (block 106). For example, this may include ejection or separation of the EW asset from the projectile round based on the calculated trajectory and distance to the known location of CFR. In one of many alternatives, the projectile round may be tracked, e.g. by radar, and triggered by an operator to eject the EW asset at a desired overhead location. Once ejected or detached, the EW asset may fall to the ground surface slowly with a parachute, and the EW asset may be activated (block 108). Then, the EW effect may suppress or disable enemy threat sensor (block 110). It is noted that any number of additional steps, functions, processes, or variants thereof may be included in the method, including any disclosed relative to any other figure of this disclosure.

Figure 4:
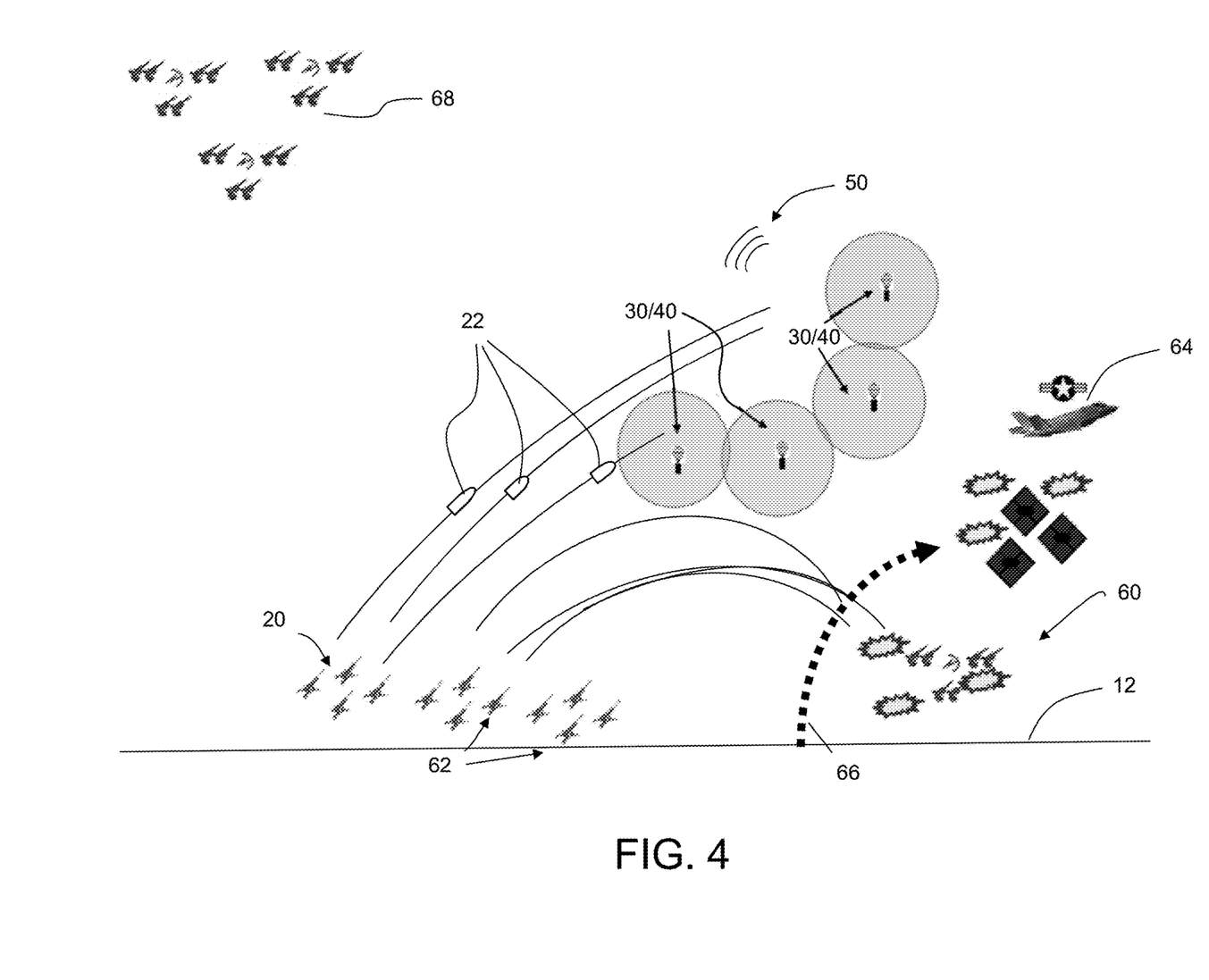
FIG. 4 schematically illustrates deployment of an EW asset from a delivery round in a second scenario, in accordance with a second embodiment of the present disclosure.

FIG. 4 schematically illustrates deployment of an EW asset from a delivery round in a second scenario, in accordance with a second embodiment of the present disclosure. In particular, FIG. 4 illustrates a scenario in which the invention of the present disclosure can be used to suppress enemy air defenses. As shown in FIG. 4, FA fires 62 are used to conduct an EW asset 30 support, by providing sustained lethal fire on which may deliver sustained fire on the threat forces 60. These threat air defense assets 60 within FA range are engaged with conventional, lethal munitions and/or ground munitions. A friendly close air support (CAS) aircraft 64 is conducting a mission in the vicinity of the threat forces 60. Threat ADA located within artillery range are engaged with lethal munitions, as shown at 66. At the same time, guided munitions are employed against threat long range assets 68 which are beyond FA range but within their own range capability against friendly air assets. The guided munitions launch the EW assets 30 carried by the parachutes 40, which suppress threat long range air defense by electronically obscuring the friendly CAS aircraft during their strike by use of the EW effect 50.

Figure 5:
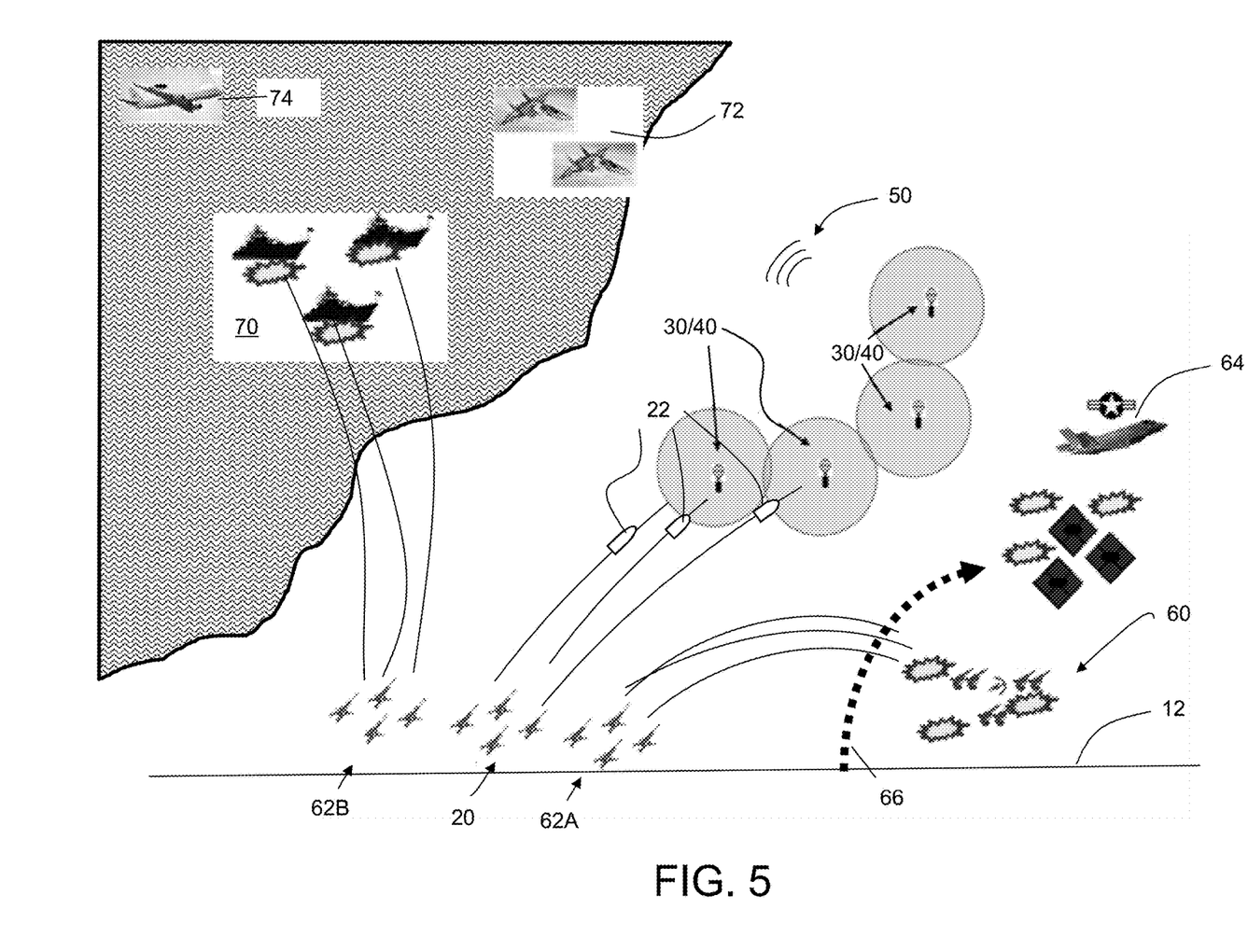
FIG. 5 schematically illustrates deployment of an EW asset from a delivery round in a third scenario, in accordance with a third embodiment of the present disclosure.

FIG. 5 schematically illustrates deployment of an EW asset from a delivery round in a third scenario, in accordance with a third embodiment of the present disclosure. Specifically, FIG. 5 illustrates a scenario for suppression of enemy air defenses in a cross-domain setting (ground versus air & maritime). As shown, enemy threats are positioned as air defense threats 60 located on the ground, as maritime threats from naval vessels (DDGs with AD capabilities) 70, as offensive fighter aircraft 72, and as threat airborne warning and control systems (AWACS) 74. Threat ADA located within artillery range are engaged with lethal munitions, as shown at 66. Conventional FA fires 62A are employed against threat air defense assets within FA range 60. At the same time, conventional FA fires 62B are employed against enemy maritime threats 70 located in a body of water. Cross-Domain effects are achieved employing guided munitions fires to isolate the CAS target 64 by obscuring sensors and weapons aboard the AWACS aircraft 74, guided missile destroyers 70, and fighter aircraft 72.

Figure 6:
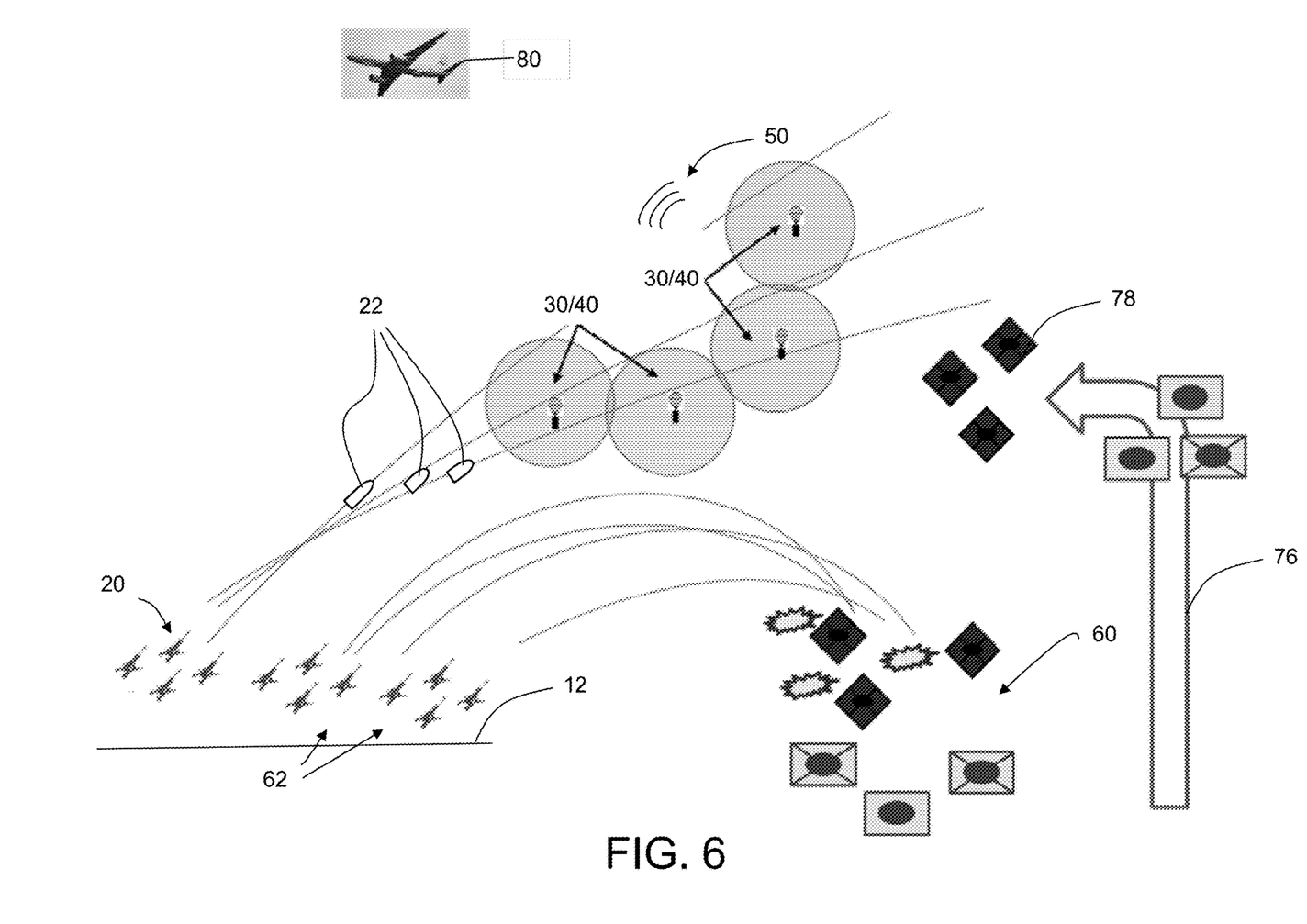
FIG. 6 schematically illustrates deployment of an EW asset from a delivery round in a fourth scenario, in accordance with a fourth embodiment of the present disclosure.

FIG. 6 schematically illustrates deployment of an EW asset from a delivery round in a fourth scenario, in accordance with a fourth embodiment of the present disclosure. In particular, FIG. 6 illustrates a scenario for counter airborne intelligence, surveillance and reconnaissance (ISR) with a cross-domain effect (ground versus air). As shown, FA fires 62 support friendly maneuver forces in close combat with threat maneuver forces 60. Projectile rounds 22 in the form of guided munition fires carry the EW assets 30, which are employed in support of friendly armored task force 76. This friendly armored task force 76 is penetrating to attack threat second-echelon force 78. The EW assets 30 carried by the parachutes 40 isolate the second echelon 78 by obscuring threat battlefield surveillance radar aboard threat airborne ISR aircraft 80.

Various changes may be made in the above scenarios and within the disclosure as a whole without departing from the spirit and scope thereof. For example, in the scenarios, while the EW assets 30 have been illustrated as being deployed from ground-based field artillery pieces, the EW assets 30 may be deployed from ship based artillery, or from flying aircraft out of the range of the SAM assets. Still other changes are possible and envisioned, as would be recognized by those in the field, all of which are considered within the scope of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for deployment of an electronic warfare (EW) asset, the system comprising:
    a projectile launching device capable of launching a projectile round;
    an EW asset detachably carried by the projectile round; and
    a deployable parachute attached to the EW asset, wherein the EW asset is configured to be suspended from the parachute when the EW asset is detached from the projectile round, wherein the projectile round is an unpowered projectile, and the EW asset includes a radar jamming device, wherein the EW asset is configured to provide obscuration from an enemy counterfire radar (CFR) system.

2. The system of claim 1, wherein the EW asset is configured to activate upon detachment from the projectile round.

3. The system of claim 1, wherein the projectile round is a guided projectile round or an unguided projectile round; an unguided rocket; and an unguided missile.

4. The system of claim 1, wherein the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

5. A method for deploying an Electronic Warfare (EW) asset for suppression or obscuration of enemy counterfire radar (CFR) system, the method comprising:
    providing a projectile round carrying a detachable EW asset and parachute;
    launching the projectile round;
    separating the EW asset and parachute from the projectile round; and
    initiating an EW effect by the EW asset as the EW asset floats towards a ground surface, wherein the projectile round is an unpowered projectile, and the EW asset includes a radar jamming device, wherein the EW asset is configured to provide obscuration from an enemy counterfire radar (CFR) system.

6. The method of claim 5, wherein the projectile round is launched substantially over a CFR asset or over a battlefield.

7. The method of claim 5, wherein initiating the EW effect provides obscuration from the enemy CFR system, wherein the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

8. The method of claim 7, further comprising launching lethal lire munitions at the CFR system concurrently, or substantially concurrently, with the launching of the projectile round carrying the EW asset.

9. The method of claim 5, wherein the projectile round is fired from one of: a ground based field artillery piece; a naval vessel, or an airborne aircraft.

10. The method of claim 5, wherein the projectile round is a guided projectile round or an unguided projectile round.

11. A deployable electronic warfare (EW) device comprising:
   a projectile round;
   an EW asset detachably carried by the projectile round;
   a deployable parachute attached to the EW asset, wherein the EW asset is configured to be suspended from the parachute when the EW asset is detached from the projectile round; and
   a system for activating the EW asset after detachment from the projectile round, wherein the projectile round is an unpowered projectile, and the EW asset includes a radar lamming device, wherein the EW asset is configured to provide obscuration from an enemy counterfire radar (CFR) system.

12. The deployable EW device of claim 11, wherein the EW asset provides suppression or obscuration of an enemy counterfire radar (CFR) system.

13. The deployable EW device of claim 12, wherein the CFR system comprises at least one of: a surface-to-air missile (SAM) asset; a ground-based CFR asset; an air-based CFR asset; a long-range threat; an airborne warning and control system (AWACS) aircraft; or an intelligence, surveillance, and reconnaissance (ISR) aircraft.

14. The deployable EW device of claim 11, wherein the projectile round is fired from one of: a ground based field artillery piece; a naval vessel, or an airborne aircraft.

15. The deployable EW device of claim 11, wherein the projectile round is a guided projectile round or an unguided projectile round.

* * * * *